(12) United States Patent
Gimbel

(10) Patent No.: US 9,075,843 B2
(45) Date of Patent: Jul. 7, 2015

(54) AUTHORIZATION CHECK OF DATABASE QUERY THROUGH MATCHING OF ACCESS RULE TO ACCESS PATH IN APPLICATION SYSTEMS

(75) Inventor: Matthias Gimbel, Waldbrunn (DE)

(73) Assignee: SAP SE, Walldorf (DE)

( * ) Notice: Subject to any disclaimer, the term of this patent is extended or adjusted under 35 U.S.C. 154(b) by 517 days.

(21) Appl. No.: 12/851,332

(22) Filed: Aug. 5, 2010

(65) Prior Publication Data

US 2012/0036162 A1 Feb. 9, 2012

(51) Int. Cl.
*G06F 17/30* (2006.01)
*G06F 21/62* (2013.01)

(52) U.S. Cl.
CPC .... *G06F 17/30477* (2013.01); *G06F 17/30471* (2013.01); *G06F 17/30442* (2013.01); *G06F 17/30474* (2013.01); *G06F 21/6227* (2013.01)

(58) Field of Classification Search
CPC ................ G06F 17/30471; G06F 17/30306; G06F 17/30368; G06F 21/6227
USPC ......... 707/706, 713, 717–719, 722, 736, 758, 707/781, 999.002–6
See application file for complete search history.

(56) References Cited

U.S. PATENT DOCUMENTS

| | | | |
|---|---|---|---|
| 6,487,552 B1 * | 11/2002 | Lei et al. ............................... | 1/1 |
| 6,631,371 B1 * | 10/2003 | Lei et al. ....................... | 707/694 |
| 7,080,062 B1 * | 7/2006 | Leung et al. ........................... | 1/1 |
| 7,281,003 B2 * | 10/2007 | Lei et al. ............................. | 1/1 |
| 7,568,235 B2 * | 7/2009 | Bird et al. ........................ | 726/27 |
| 2002/0038313 A1 * | 3/2002 | Klein et al. .................... | 707/200 |
| 2005/0038783 A1 * | 2/2005 | Lei et al. ............................ | 707/5 |
| 2006/0059567 A1 * | 3/2006 | Bird et al. ........................ | 726/27 |
| 2007/0276861 A1 * | 11/2007 | Pryce et al. ............... | 707/103 R |
| 2008/0065640 A1 * | 3/2008 | Shulman et al. ................... | 707/9 |
| 2009/0327216 A1 * | 12/2009 | Brown et al. ....................... | 707/2 |
| 2012/0016901 A1 * | 1/2012 | Agarwal et al. ............... | 707/769 |

OTHER PUBLICATIONS

"Application Programming and SQL Guide: Version 8—Chapter 27", *DB2 Universal Database for z/OS*, IBM,(Mar. 2004),ToC, and 727-784.

Ioannidis, Yannis E., "Querry Optimization", *ACM Computing Surveys*, vol. 28, No. 1, (Mar. 1996),121-123.

Ioannidis, Yannis E., "Query Optimization", [Online]. Retrieved from the Internet: <URL: http://infolab.stanford.edu/~hyunjung/cs346/ioannidis.pdf>,38 pgs.

* cited by examiner

*Primary Examiner* — Syling Yen
(74) *Attorney, Agent, or Firm* — Schwegman Lundberg & Woessner, P.A.

(57) ABSTRACT

A method is provided to check user authorization to access a database, the method comprising: receiving a database query; producing an execution plan for the query; receiving an access rule applicable to a user associated with the query; determining whether the access rules permits processing of the query according to the plan; and rejecting the query in response to a determination that the access rule does not allow processing of the query according to the plan.

23 Claims, 4 Drawing Sheets

AUTHORIZATION CHECK OF DATABASE QUERY THROUGH MATCHING OF ACCESS RULE TO ACCESS PATH IN APPLICATION SYSTEMS

BACKGROUND

A database comprises a self-describing integrated collection of data. In addition to a user's source data, the database includes a description of its own structure referred to as a data dictionary or metadata. In essence, a database serves as a model of a user's model. For example, a database may model the way in which a user views her business. In a hierarchical database, data is organized into a tree-like structure, often in tables. The structure allows repeating information using parent/child relationships. Each parent can have many children but each child only has one parent. In a relational database, data are stored in relations, which are perceived by users as tables. According to the relational model, each relation comprises tuples (records) and attributes (fields). A relational database comprises a set of relations. A database also includes indexes that are used to represent relationships among the data and to improve the performance of database applications. There exists a well-defined set of operations on relations that allow them to be combined and manipulated in various ways. The details of these operations are unimportant to the subject matter of this application, and will not be discussed herein. Additional details of database design methodologies are provided in, *An Introduction to Database Systems*, by C. J. Date, Addison Wesley, 2003.

Tables often are the primary structures in a database, especially in a relational database. In a relational database, each table typically describes a collection of similar objects that correspond to a single specific subject. When the subject is an object, the table represents something tangible, such as a person, place or thing. When the subject is an event, the table represents something that occurs at a given point in time and has characteristics to be recorded. In a relational database, the logical order of records and attributes within a table is of no significance. Every table in a relational database contains at least one field known as its primary key that uniquely identifies each of its records. The field is the smallest structure in a relational database, and it presents a characteristic of the subject of the table to which it belongs. Every field in a well designed relational database contains one and only one value. A record represents a unique instance of the subject of a table. A record is composed of the entire set of fields of the table. In accordance with the structure of a relational database, each record is identified throughout the database by a unique value of the primary key field of that record.

An application system as referred to herein typically includes a database, a database management system (DBMS) and application programs that utilize the DBMS to access the database. An application may include menus, forms, reports and programs used to configure a computer system to process a portion of a database to meet a user's information needs. A DBMS comprises a set of programs to configure a computer system to define, administer and process a database and its applications. Large application systems often host thousands of individual users and dynamically map user sessions to database sessions with the consequence that the database sessions run in a special, different user context.

Typically, a user requests data from a relational database through a user interface to an application that sends a query that is written in a special language, usually some variation of the relational database syntax known as Structured Query Language (SQL). Note that SQL uses the term table to refer to the relational model's relation, uses the term row to refer to the relational model's tuple or record and uses the term column to refer to the relational model's attribute or field. These terms are used interchangeably in this specification. In response to a query, the relational database returns a result set, which comprises a list of rows containing answers. In practice, relational database management systems often rewrite ("optimize") queries to perform more efficiently, using a variety of techniques.

Security is imposed upon database access to maintain confidentiality and integrity of data, for example. Often, a database contains certain data that is to be accessed only by designated users or applications. Similarly, a database frequently contains certain data that is to be modified only by certain users or applications. In a relational database, data pertaining to different subjects ordinarily are contained in different tables. Accordingly, security authorization typically is required as a prerequisite to the access and/or modification of certain tables by certain users or certain applications. As such, a table comprises a semantically complete unit with respect to the granularity of the authorization rules Within the application context as described in above, a database generally does not distinguish individual application users. Thus, in general an application that accesses a relational database may be called upon to impose security by checking whether users of the application have access rights to the data they seek to access and/or modify. That is, although data is stored in a database, security to protect the database from unauthorized user access or modification occurs at the level of an application used to access the database. Accordingly, an application that accesses the database often is called upon to perform security checks upon user access to the database.

A query typically is employed by a user or an application to gain access to the data within a relational database. Thus, an application that accesses a database may be called upon to determine whether execution of a database query within the database would result in unauthorized access to or modification of a table within the database. Queries can be complex, however, and it can be difficult to determine whether a given query would result in unauthorized access to or unauthorized modification of a table. For example, parsing a query statement can be challenging since it requires detailed knowledge of the query language used and may be error-prone due to incomplete specifications.

SUMMARY

In one aspect, a method is provided to check user authorization to access a relational database. An execution plan is produced for a user query. The user may be a person or an application program. A determination is made as to whether an access rule applicable to the user permits processing of the query according to the plan. The query is rejected in response to a determination that the access rule does not allow processing of the query according to the plan.

In another aspect, an execution plan is produced for a user query. The execution plan indicates a database structure used in the course of processing of the query and also indicates a type of access to the indicated structure performed in the course of processing the query. An access rule applicable to a user is obtained that specifies a database structure and a type of access to the specified structure and that also specifies an action. A determination is made as to whether the database structure and the access type indicated by the plan match the database structure and the access type specified by the rule. The action indicated by the rule is performed in response to a determination that the database structure indicated by the plan matches the database structure specified by the rule and that the access type indicated by the plan matches the access type specified by the rule.

In yet another aspect, a computer system is configured to implement a relational database management system configured to receive a database query and to produce an execution plan for the query. The computer system is further configured to implement an application program configured to determine whether the access rules permits processing of the query according to the plan and to reject the query in response to a determination that the access rule does not allow processing of the query according to the plan.

These and other features and advantages will be understood from the following detailed description of embodiments in conjunction with the appended drawings.

DESCRIPTION OF THE EMBODIMENTS

The following description is presented to enable any person skilled in the art to create and use a computer system configuration and related method and article of manufacture to determine whether a database query received from a user or application is authorized by comparing authorization access rules with an access path generated for the query. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

OVERVIEW

Figure 1:
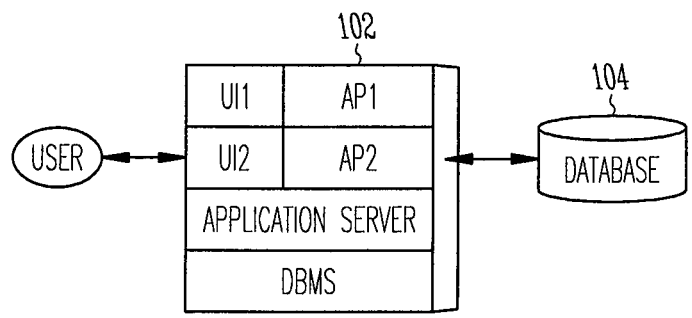
FIG. 1 is an illustrative generalized block diagram of a computer system configuration that can access a relational database in accordance with some embodiments.

FIG. 1 is an illustrative block diagram of a computer system 102 configured to access a relational database 104. The computer system 102 is configured to run a first database application AP1 and a second database application AP2. The computer system also is configured to run a DBMS. A user interacts with a first user interface UI1 to communicate with the database 104 through AP1, and the user interacts with a second user interface UI2 to communicate with the database 104 through AP2. An Application Server hosts user/application sessions and provides user access to the DBMS through a common channel in which security can be enforced. Within an application server context, the applications AP1 and AP2 can be embedded in the application server and use common functions (as e.g. user and session management) from this infrastructure. A user can transmit transaction messages such as a query and data though a user interface, UI1 or UI2, to a corresponding application, AP1 or AP2. An application (AP1 or AP2) receiving a user query, for example, accesses the DBMS for services, and the DBMS processes the query using the database 104. When the transaction is completed, the results are returned to the user through the appropriate user interface. It will be appreciated that different components of the computer system 102 of FIG. 1 may be located on different machines. For instance, the DBMS and the applications (AP1 and AP2) may reside on different physical machines for scalability purposes.

Query optimization is a built-in function of many database management systems that attempts to determine the most efficient way to execute a query. In general, one goal of a query optimization is to eliminate unneeded tuples or rows when possible. In general, there are multiple access plans that an relational database management system (RDBMS) can follow to process a given query. Different plans are identical in terms of their output, but may differ in terms of their costs, i.e. the amount of time they may require to run. A query optimizer considers the possible query plans for a given input query, and attempts to determine which of those plans will be the most efficient. The set of query plans examined can be formed by examining the possible access paths (e.g. index scan, sequential scan) and join algorithms (e.g. sort-merge join, hash join, nested loops). As explained below, a RDBMS' built-in query optimization function is used in some embodiments to produce an access path (or execution plan) for a query for use in testing whether such query is in compliance with security requirements.

Figure 2:
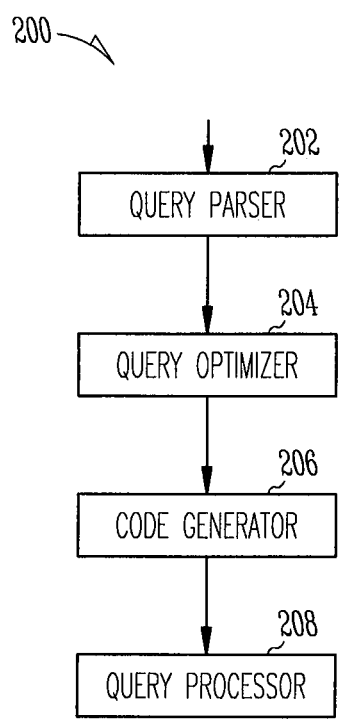
FIG. 2 is an illustrative flow diagram that represents typical query flow through an RDBMS and that shows the role of a query optimization.

FIG. 2 is an illustrative flow diagram that represents typical query flow 200 through an RDBMS and that shows the role of a query optimization. The computer system of FIG. 1 can be configured by computer program code to implement a process represented by the flow 200. A query parser 202 parses a query and provides input to a query optimizer 204. A code generator 206 produces executable code based upon the optimized query produced by the query optimizer 204. A query processor 208 processes the code representing the optimized query whenever control reaches that query during program execution.

A typical database has a set of tools (e.g. IBM Visual Explain) allowing the display a query access plan. DB2 for z/OS, DB2 for Linux, Unix and Windows, DB2 for I, Oracle, MaxDB employ the term "Explain", for example, and so they provide a command like "EXPLAIN plan" for <statement text>. Microsoft SQL Server, for example, employs the term "Execution Plan" and has a command like "SET SHOWPLAN_TEXT ON".

Figure 3:
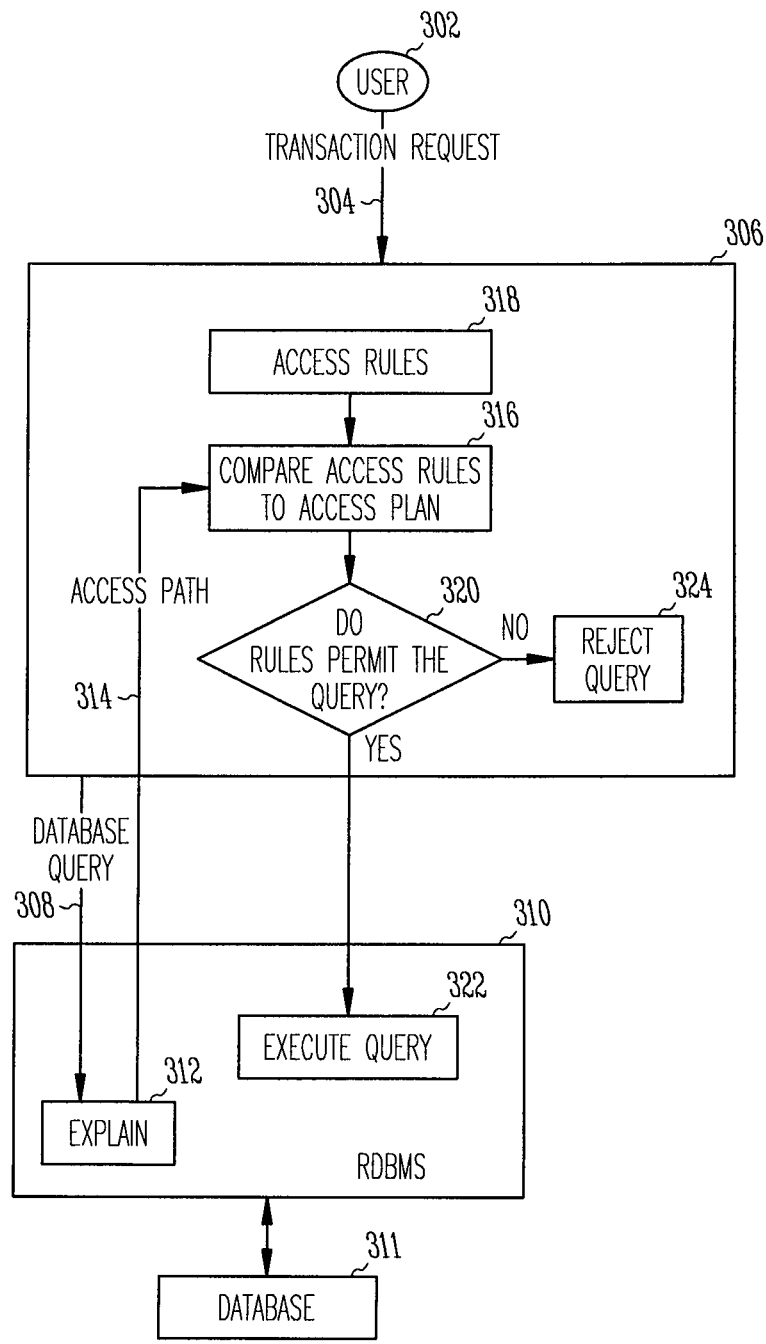
FIG. 3 is a structural flow diagram showing a flow of information and control during an authorization check of a user query and the structures of the computer system configured as in FIG. 1 involved in the various processes that are active in the course of the flow in accordance with some embodiments.

FIG. 3 is a structural flow diagram showing a flow of information and control during an authorization check of a user query and the structures involved in the various processes that are active in the course of the flow in accordance with some embodiments. Certain blocks in FIG. 3 represent a computer system such as that of FIG. 1 or a portion thereof configured using machine readable program code stored in a computer readable storage device to perform the functions associated with such blocks. A user 302 makes a transaction request 304 to an application 306 running on a computer system such as that shown in FIG. 1. In response to the transaction request, the application 306 sends a database query 308 to a DBMS 310 running on a computer system such as that shown in FIG. 1. The DBMS controls access to database 311. In response to the database query, block 312 of the DBMS 310 performs a query optimization as described with reference to FIG. 2. However, in the course of that query optimization, block 312 of FIG. 3 produces an access plan (also referred to as an execution plan) that is indicative of the output of the query optimizer block 204 of FIG. 2 without actually executing the query. In some embodiments the block 312 configures a computer system to run a query optimizer tool, specifically the "EXPLAIN' monitoring tool, which is described in, "Universal Database for z/OS Version 8, Application Programming and SQL Guide Volume 2", IBM Publication Number SC18-7415-00, Chapter 27, "Using Explain to improve SQL performance". In principle, the EXPLAIN function produces a 'preview' of the optimized plan which would be executed if the user/application would execute the query immediately without doing our authorization check. Thus, EXPLAIN delivers the output of the optimizer flow of FIG. 2.

Thus, in response to the user query, the block 312 produces an access plan (or path) that corresponds to the query without actually executing the query. As explained below, the access plan is compared with security access rules applicable to the user making the query to determine whether or not to permit execution of the query. More particularly, in the illustrated embodiment, the user 302 makes a transaction request 304 for information from the database, and the application 306 formulates the database query 308 based upon the user's request 304. The DBMS 310 in turn produces an optimized query, which the query that is actually executed. Alternatively, the user 302 could formulate a query directly, which then would be optimized by the DBMS 310. It will be appreciated that it is possible that the query 308 may violate certain access rules such as rules pertaining to which entities within the database 311 can be accessed or rules pertaining to permitted kinds of access.

Different access rules may apply to different users. As used herein, a user may be an individual person or an application, for example. A user may be identified through an access code such as a password or some other identifier. Different access rules may apply to different users who are permitted access to different subsets of information within a database depending upon the user's role within an organization (for an individual person) or within a computing system (for an application). A user with a sales role in an organization may have access to tables within a database that contain information about product inventory and discount pricing, but may not have access to tables that contain information about individual health benefits or compensation of other persons within the organization. Conversely, a user with a human resources role in an organization may have access to tables that contain information about individual health benefits or compensation of other persons within the organization, but may not have access to tables within a database that contain information about product inventory and discount pricing. While some portions of a database may be accessible only to selected users, other database information may be open to all users. For example, general product information may be open to all users. Thus, when a user initiates a query 308 to request information from a database through an application, for example, the user is identified, and one or more access rules such as access rules associated with the user's role within the organization are identified. These access rules are used to determine whether the user should be granted the requested access to the database.

Since the DBMS 310 itself typically does not distinguish between different users, an access security check of the query 308 associated with the user 302 is performed prior to allowing processing of the query within the database 311. In other words, access rules associated with a user are identified and are used to determine whether the user is permitted to access database information requested through the query 308 prior to allowing processing of the query. In some embodiments, an access security check is implemented within an application process that accesses the database. In other embodiments, an access security check may be performed within a tool, that is distinct and separate from any given application, that filters access to the database based upon access rules.

A comparison block 316 within the application 306 configures a computer system to compare authorization access rules 318 applicable to the user 302 who made the transaction request 304 (or who perhaps formulated the query directly) with the access path 314, or a portion thereof, produced by the block 312. Decision block 320 configures the computer system to determine whether results of the comparison by block 316 indicate that the access rules 318 permits processing of the query 308. If the rules do allow execution of the query 308, then control passes to a block 322 within the DBMS 310, which configures the computer system to cause execution of the query within the database 311. If the rules do not allow execution of the query 308, then the query 308 is rejected as indicated by block 324. A rejection of a query is reported to the user 302.

Figure 4:
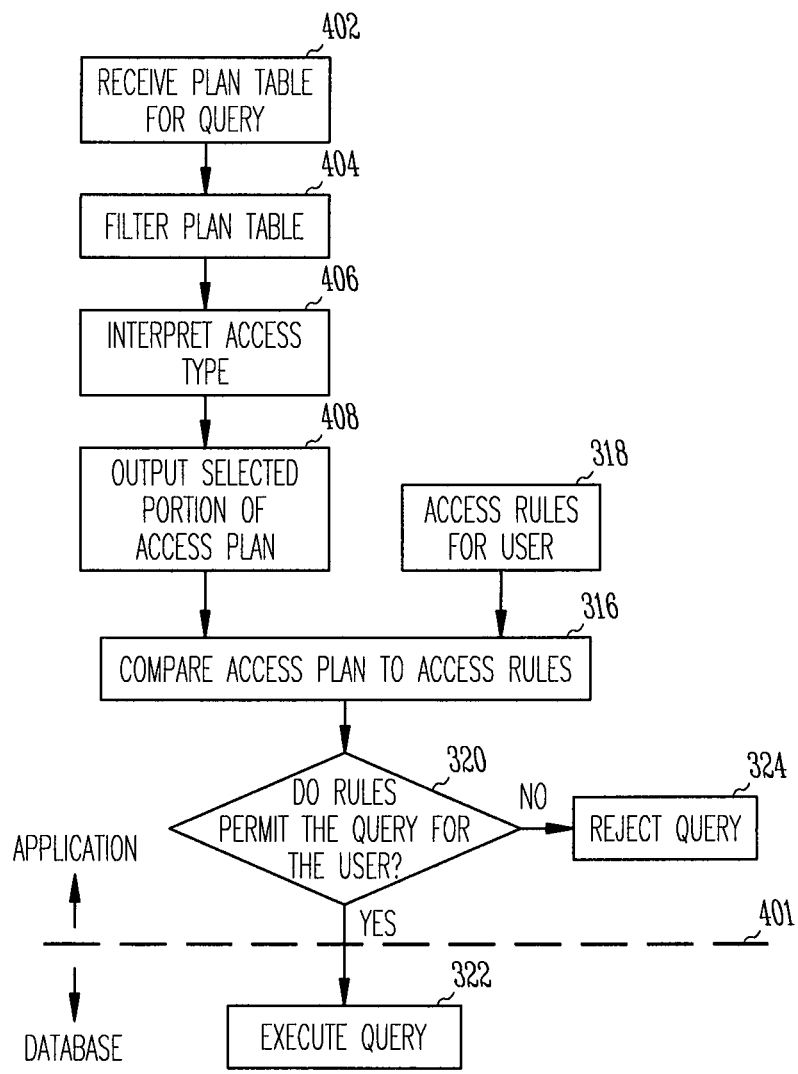
FIG. 4 is an illustrative flow diagram representing additional details of a portion of the process of FIG. 3 that compares authorization access rules to the generated access path in accordance with some embodiments.

FIG. 4 is an illustrative flow diagram representing additional details of a portion of the process of FIG. 3 that compares authorization access rules to the generated access path in accordance with some embodiments. Items in FIG. 4 that are substantially identical to items in FIG. 3 are labeled with identical reference numerals. Blocks in FIG. 4 represent a computer system such as that of FIG. 1 or a portion thereof configured using machine readable program code stored in a computer readable storage device to perform the functions associated with such blocks. Dashed line 401 indicates in general the locations where various blocks reside, either on the application side or the database side. Block 402 receives a 'plan table' which is an information structure encoded in a computer readable storage device and which is produced by the EXPLAIN monitoring tool indicative of the access path (or execution plan) within the database 311 for the query 308. Block 404 filters the plan table to extract information to be evaluated against the authorization rules (also referred to herein as 'access rules'), which may comprise a set of individual rules. In some embodiments, the information extracted from the plan table identifies a database entity and a kind of access. In embodiments described below which employ EXPLAIN to produce an access path in the form of a plan table, the database entity to be evaluated is represented by a schema (also referred to as the 'creator') and a table_name within the plan table and the kind of access is represented by the qblock_type within the plan table.

In many cases, temporary tables are created during query execution. Temporary table contents are derived from the other tables used during query execution, and so a temporary table contains no 'new' data with respect to access control, and as such the production of such temporary tables in the course of execution of a query is not used as a basis to block access. Accordingly, block 404 does not extract temporary tables for use in evaluation of whether access rules would reject a query. In other words, temporary tables are ignored in determining whether or not to reject the query. The EXPLAIN tool itself performs a level of error checking and filtering upon the access path of the query before sending the access path to the application for use in a security check. For example, Data Definition Language (DDL) DDL statements cause an EXPLAIN error, so the EXPLAIN component will reject such a query as not explainable and the application can reject the query directly. DDL statements are the statements which define and delete entire tables, functions and structures, and they can be filtered out based on an EXPLAIN error. A different category is data control language (DCL) which is used to change database access restrictions, which are filtered out as well. Thus, tables that are produced in the course of query execution but that are not a part of the database are filtered out by EXPLAIN.

Moreover, EXPLAIN automatically transforms accesses to views (logical objects which in turn are defined by other queries) to the accesses to the physical tables. A view itself does not contain data, but rather a view is mapped to base tables that contain data. By transforming views to corresponding base tables, EXPLAIN advantageously can be used to prevent a user to employ a view to circumvent a security check and gain unauthorized access to a base table.

Block 406 interprets the access type. In general terms, access permission may be read-only access permission kind or write access permission kind. The interpreter block 406 interprets the types of access indicated in an access path as either read access type or write access type. For example, in some embodiments, a user (e.g. a database administrator) is allowed to access all tables of the system catalog (e.g. all tables residing in the Schema "SYSIBM") and to all Tables of an arbitrary schema whose name start with "DB2" (e.g. the DB monitoring tables). However, the user is not allowed to see the contents of application tables (such as e.g. Payment items within a banking solution, or HR-related information). Furthermore, in this example, the user may not be permitted to change any application data. So in this example, the user would be given read access to SYSIBM.SYSTABLES and to SAPR3.DB2MISC, but would not be given read access SAPR3.BCA_PAYMENT_ITEM. Furthermore, the user would not be permitted change data in certain tables, and so the user would be denied access involving, INSERT, DELETE, TRUNCATE, MERGE, or UPDATE that could change the contents of such tables. Block 406 interprets access type indicated in the access plan as either read type or write type so that the access plan can be compared more readily to the access rules. Accesses that cannot modify data are interpreted as read type. Accesses that can modify data are interpreted as write type.

Block 408 outputs a selected portion of the access path (i.e. that portion that has been extracted by block 404 and interpreted by block 406) in a canonical format or pattern suitable for easy comparison with the access rules applicable to the user who caused the query. Block 318 obtains the access rules applicable to the user who caused the query. Comparison block 316 compares the access path (i.e. the selected portion extracted by block 404 and interpreted by block 406) to the access rule applicable to the particular user. As explained above, decision block 320 determines whether results of the comparison by block 316 indicate that the access rules 318 permits processing of the query 308. Note that an access rule as well as a plan table can have several entries and a query is accepted (i.e. permitted), if for all elements of the plan a matching rule entry is found which allows execution. If the rules do allow execution of the query 308, then control passes to a block 322. If the rules do not allow execution of the query 308, then the query 308 is rejected as indicated by block 324.

Illustrative Code Embodiment

In some embodiments, the process of FIG. 4 is divided into a plan extraction interpretation component and an access rule evaluation component.

A) Plan Interpretation

The plan interpretation component takes as its input (e.g. through block 402) an output of an optimization tool such a plan table indicative of or containing an access path/Explain Output. This input typically involves an action performed on a database table together with an abundance of technical information on database techniques employed for this access and cost information. The plan interpretation component extracts (e.g. block 404) and interprets (e.g. block 406) for each execution step the information according to the following scheme:

(Schema, Table Name, Kind of access). (Kind of access is "readonly" or "write")

In some embodiments, the code for the interpretation component is as follows:

```
        loop at pt_itab[ ] assigning <plan_table_line> where
table_type = 'T' or table_type = 'M'.
            "extract kind of access:
    if <plan_table_line>-qblock_type <> 'SELECT' AND
        <plan_table_line>-qblock_type <> 'CORSUB' AND
        <plan_table_line>-qblock_type <> 'NCOSUB' AND
        <plan_table_line>-qblock_type <> 'TABLEX' AND
        <plan_table_line>-qblock_type NS 'UNION' AND
        <plan_table_line>-qblock_type NS 'INTER' AND
        <plan_table_line>-qblock_type NS 'EXCEPT'.
        mapping_output_line-kind_of_access = write.
            else.
                mapping_output-line-kind_of_access = read.
    endif.
            "extract table name and schema:
            Mapping_output_line-schema =
            <plan_table_line>-creator.
            Mapping_output_line-table_name =
            <plan_table_line>-table_name.
            Append mapping_output_line to mapping_output.
    endloop.
```

In plan interpretation code, '< >' signifies, 'not equal to'. The symbol 'NS' signifies 'does not contain string'. According to the plan interpretation code, the 'creator' (i.e. schema), table name and access type are extracted from the plan table. Moreover access type is interpreted as read or as write in the course of extracting the access kind. More specifically, if the access type is neither SELECT, nor CORSUB, nor NCORSUB, nor TABLEX and does not contain UNION, nor INTER, nor EXCEPT, then the access kind is interpreted to be write access. Otherwise, the access kind is interpreted to be read access.

Thus, for each query step a database schema and/or table to be treated is extracted (block 404), and the kind of access (read or write) is interpreted (block 406) for extracted item(s). The result (e.g. block 408) is a table with lines of the form Schema, Table Name, Kind of access.

Note only tables of type 'T' or 'M' are extracted for evaluation. It will be understood that in some embodiments all table types, except for "T" (Table) and "M" (Materialized Table) are temporary objects created during query execution. Therefore, the data they contain must have been constructed within other parts of the same execution plan, so the respective data access can be checked those other parts of the plan.

Accordingly, the extraction block 404 filters out those lines from the Explain output that contain table types other than T or M.

B) Rule Evaluation

The output of the mapping component (e.g. block 408) is evaluated (e.g. block 316) against a set of rules (e.g. block 318). In the illustrated example, a query is valid, if it satisfies the complete set of rules. Rules can be coded as a list of patterns together with the action to be taken if a query satisfies the rule. For example, in some embodiments, the rule, "Allow all read-only statements accessing only tables of creator SYSIBM" is coded as

| Kind of access | Creator | Table | Action |
| --- | --- | --- | --- |
| Read | SYSIBM | * | allow |

The symbol * is a wildcard and stands for a deliberate number of deliberate characters. The asterisk symbol * stands for "all tables", and therefore, DB2* would signifies that for "all tables whose names start with "DB2".

The code for the rule evaluation component is as follows:

```
Loop at mapping_output into current_mapping_line.
    "search for rule matching current mapping line:
        Rule_found = false.
        Loop at rules into current_rule.
            If mapping_output-Kind_of access = current_rule-
kind_of_access
                And mapping_output-creator CP current_rule-creator
                And mapping_output-table   CP current_rule-table.
    "rule found:
                Rule_found = true.
                If current_rule-action = deny.
                    Raise exception "Security Violation".
                Endif.
            Endif.
        Endloop.
    "no rule found:
        If rule_found = false.
            Raise exception "Security Violation".
        Endif.
Endloop.
```

In the above code, 'CP' stands for 'covers pattern' which is a standard ABAP language element which is used to find out a string matches a pattern like "DB2*".

Thus, in some embodiments, a matching rule is sought for each line of the mapping output. The first rule that matches the mapping line determines the action to be performed. If no matching rule is located for the current mapping then the query is rejected.

ILLUSTRATIVE EXAMPLES

The following set of illustrative authorization access rules apply to all of the following examples:

Authorization Access Rules

| Rule No | Kind of access | Schema | Table Name | Action |
| --- | --- | --- | --- | --- |
| 1 | Write | SYSIBM | SYSTABLES | allow |
| 2 | Read | SYSIBM | * | allow |
| 3 | Read | * | DB2* | allow |

In other words, according to the above example rules, write access is allowed to table SYSIBM.SYSTABLES; read access is allowed to all SYSIBM tables; and read access is allowed all tables whose name starts with "DB2".

Example A

WRITE Access which is Allowed

The following query statement updates SYSIBM.SYSTABLES, which is allowed according to Rule 1.

Query A='Update SYSIBM.SYSTABLES set cardf=1.0 where creator='SAPR3' and name='SVERS'.

Explain Output/Plan Table (Selected lines) produced for the above Query A (Note that a complete EXPLAIN 'plan table' may have 54 columns, but only a selected few are shown here.):

| queryno | qblockno | planno | creator | tname | qblock_type | table_type |
| --- | --- | --- | --- | --- | --- | --- |
| 1.347.977 | 1 | 1 | sysibm | systables | update | T |

Mapping Output/access path information for Query A (Note that the schema (creator), and table name have been extracted (block 404) and qblock type has been extracted (block 404) and interpreted, i.e 'update' is interpreted as a 'write' type action (block 406)):

| Schema | Table Name | Kind of Access |
| --- | --- | --- |
| SYSIBM | SYSTABLES | WRITE |

In this example A, the first matching rule from the above access rules table is Rule 1.

Result: Allow; process Query A.

Comment: Qblocktype "Update" is mapped to (i.e. interpreted (block 406) as) "Write" within the mapping component because it does not match any of the "allowed" qblock types. The result of the mapping component matches Rule 1 which allows the access.

Example B

WRITE Access which is Forbidden

Updating Table SVERS is not allowed because it does not belong to schema SYSIBM.

Query B='Update SVERS set version=999.'

Explain Output/Plan Table (Selected lines) produced for the above Query B:

| queryno | qblockno | planno | creator | tname | qblock_type | table_type |
|---------|----------|--------|---------|-------|-------------|------------|
| 1.607.159 | 1 | 1 | Sapr3 | svers | update | T |

Mapping Output/access path information for Query B:

| Schema | Table Name | Kind of Access |
|--------|------------|----------------|
| SAPR3 | SVERS | WRITE |

In this Example B, there is no Matching Rule.
Result: Forbidden; reject Query B.
Comment: Same as Example A, but because of Schema "SAPR3" and the tablename does not start with "DB2", none of the access rules matches.

Example C

Read Access which is Allowed

Query C='Select * from sysibm.systables'
Explain Output/Plan Table (Selected lines) produced for the above Query C:

| queryno | qblockno | planno | method | creator | tname | qblock_type | table_type |
|---------|----------|--------|--------|---------|-------|-------------|------------|
| 1.251.242 | 1 | 1 | 0 | sysibm | systables | selec | T |

Mapping Output/access path information for Query C:

| Schema | Table Name | Kind of Access |
|--------|------------|----------------|
| SYSIBM | SYSTABLES | READ |

In this example C, the first matching rule from the above access rules table is Rule 2.
Result: Allow; process Query C.

Example D

Read Access which is Forbidden

Query D: 'SELECT * from BCA_PAYMITEM'
Explain Output/Plan Table (Selected lines) produced for the above Query D:

| queryno | qblockno | planno | method | creator | tname | qblock_type | table_type |
|---------|----------|--------|--------|---------|-------|-------------|------------|
| 1.548.979.32 | 1 | 1 | 0 | sapr3 | bca_payment | select | T |

Mapping Output/access path information for Query D:

| Schema | Table Name | Kind of Access |
|--------|------------|----------------|
| SAPR3 | BCA_PAYMITEM | READ |

In this Example D, there is no Matching Rule.
Result: Forbidden; reject Query D.

Example E

Forbidden Insert Hidden within SELECT

Query E='SELECT * from final table (INSERT INTO DB2MISC values (a, b, c))'.
Explain Output/Plan Table (Selected lines) produced for the above Query E:

| queryno | qblockno | planno | method | creator | tname | qblock_type | Table type |
|---|---|---|---|---|---|---|---|
| 1.814.687 | 1 | 0 | 0 | Sapr3 | db2misc | insert | T |
| 1.814.687 | 2 | 1 | 0 | sysadm | dsnbfqb(02) | select | B |

Mapping Output for Query E:

| Schema | Table Name | Kind of Access |
|---|---|---|
| SAPR3 | DB2MISC | WRITE |

In this Example E, there is no Matching Rule.
Result: Forbidden; reject Query E.

```
WITH
    TBSTATS AS (SELECT S.DBNAME, S.NAME, SUM(S.NACTIVE) AS
NACTIVE, SUM(S.SPACE) AS SPACE FROM
SYSIBM.SYSTABLESPACESTATS S GROUP BY S.DBNAME, S.NAME),
    BASETABLE AS (
    SELECT DBNAME, TSNAME, MIN(CREATOR) AS BASESCHEMA,
MIN(NAME) AS BASENAME, MIN(TYPE) AS BASETYPE FROM
SYSIBM.SYSTABLES WHERE TYPE NOT IN ('V','A','P','X') GROUP BY
DBNAME, TSNAME HAVING COUNT(*) <= 1
    UNION ALL
    SELECT S.DBNAME, S.TSNAME, R.TBOWNER AS BASESCHEMA,
R.TBNAME AS BASENAME, 'LOB('||R.COLNAME||')' AS BASETYPE
    FROM SYSIBM.SYSTABLES S, SYSIBM.SYSAUXRELS R
    WHERE S.CREATOR = R.AUXTBOWNER AND S.NAME =
R.AUXTBNAME
    UNION ALL
    SELECT S.DBNAME, S.TSNAME, R.TBOWNER AS BASESCHEMA,
R.TBNAME AS BASENAME, 'XML('||R.COLNAME||')' AS BASETYPE
    FROM SYSIBM.SYSTABLES S, SYSIBM.SYSXMLRELS R
    WHERE S.CREATOR = R.XMLTBOWNER AND S.NAME =
R.XMLTBNAME
    UNION ALL
    SELECT DBNAME, TSNAME, MIN(CREATOR)||'-'||MAX(CREATOR)
AS BASESCHEMA, MIN(NAME)||'-'||MAX(NAME) AS BASENAME,
MIN(TYPE)||'-'||MAX(TYPE)||'('||CAST(COUNT(*) AS VARCHAR(10))||')' AS
BASETYPE FROM SYSIBM.SYSTABLES WHERE TYPE NOT IN
('V','A','P','X') GROUP BY DBNAME, TSNAME HAVING COUNT(*) > 1),
    T0 AS (SELECT BT.BASESCHEMA, BT.BASENAME,
BT.BASETYPE, TBSTATS.* FROM TBSTATS LEFT OUTER JOIN
BASETABLE BT ON BT.DBNAME = TBSTATS.DBNAME AND BT.TSNAME =
TBSTATS.NAME)
    SELECT dbname, name FROM T0 WHERE BASESCHEMA IS NULL;
```

Explain Output/Plan Table (Selected lines) produced for the above Query F:

| queryno | qblockno | planno | method | creator | tname | qblock_type | Table type |
|---|---|---|---|---|---|---|---|
| 1.413.371 | 1 | 1 | 0 | sapr3 | tbstats | select | W |
| 1.413.371 | 1 | 2 | 2 | sapr3 | basetable | select | W |
| 1.413.371 | 3 | 1 | 0 | sysibm | systablespacestats | tablex | T |
| 1.413.371 | 3 | 2 | 3 | | | tablex | |
| 1.413.371 | 4 | 1 | 0 | | | uniona | |
| 1.413.371 | 5 | 1 | 0 | sysibm | systables | ncosub | T |
| 1.413.371 | 5 | 2 | 3 | | | ncosub | |
| 1.413.371 | 6 | 1 | 0 | sysibm | sysauxrels | ncosub | T |
| 1.413.371 | 6 | 2 | 4 | sysibm | systables | ncosub | T |
| 1.413.371 | 7 | 1 | 0 | sysibm | sysxmlrels | ncosub | T |
| 1.413.371 | 7 | 2 | 1 | sysibm | systables | ncosub | T |
| 1.413.371 | 8 | 1 | 0 | sysibm | systables | ncosub | T |
| 1.413.371 | 8 | 2 | 3 | | | ncosub | |

Comment: Note that the second line was filtered out by the mapping component because of type 'B' ('B' signifies a Buffer table).

Example F

Allowed More Complex Query

Query F:
Mapping Output for Query F:

| Schema | Table Name | Kind of Access |
|--------|------------|----------------|
| SYSIBM | SYSTABLESPACESTATS | READ |
| SYSIBM | SYSTABLES | READ |
| SYSIBM | SYSAUXRELS | READ |
| SYSIBM | SYSTABLES | READ |
| SYSIBM | SYSXMLRELS | READ |
| SYSIBM | SYSTABLES | READ |
| SYSIBM | SYSTABLES | READ |

In this Example F, matching rule 2 matches all rows.
Result: Allow; process Query F.
Comment: 'W' is a work file, which can be ignored.

Figure 5:
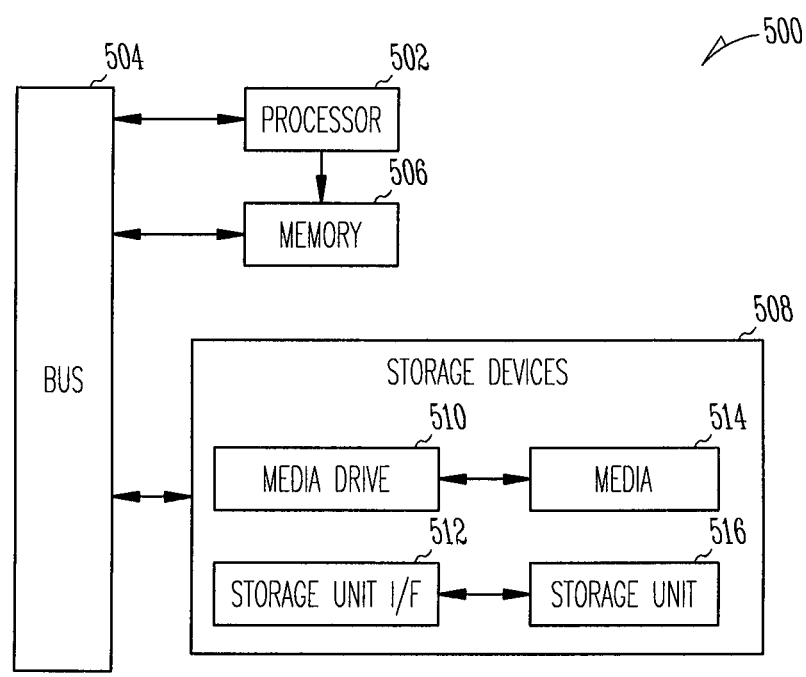
FIG. 5 is an illustrative block level diagram of a computer system that can be configured to implement computer system configuration of FIG. 1 and perform the processes involved with security authorization checks of a query directed by an application to a relational database in accordance with embodiments described with reference to FIGS. 1-4.

FIG. 5 is an illustrative block level diagram of a computer system 500 that can be configured to implement computer system of FIG. 1 and perform the processes involved with security authorization checks of a query directed by an application to a relational database in accordance with embodiments described with reference to FIGS. 1-4. Computer system 500 can include one or more processors, such as a processor 502. Processor 502 can be implemented using a general or special purpose processing engine such as, for example, a microprocessor, controller or other control logic. In the example illustrated in FIG. 5, processor 502 is connected to a bus 504 or other communication medium.

Computing system 500 also can include a main memory device 506, preferably random access memory (RAM) or other dynamic memory, for storing information and instructions to be executed by processor 502. Main memory device 506 also may be used for storing temporary variables or other intermediate information during execution of instructions to be executed by processor 502. Computer system 500 can likewise include a read only memory ("ROM") or other static storage device coupled to bus 504 for storing static information and instructions for processor 502.

The computer system 500 can also include information storage device 508, which can include, for example, a media drive 510 and a removable storage interface 512. The media drive 510 can include a drive or other mechanism to support fixed or removable storage media 514. For example, a hard disk drive, a floppy disk drive, a magnetic tape drive, an optical disk drive, a CD or DVD drive (R or RW), or other removable or fixed media drive. Storage media device 514, can include, for example, a hard disk, a floppy disk, magnetic tape, optical disk, a CD or DVD, or other fixed or removable medium that is read by and written to by media drive 510. Information storage mechanism 508 also may include a removable storage unit 516 in communication with interface 512. Examples of such removable storage unit 516 can include a program cartridge and cartridge interface, a removable memory (for example, a flash memory or other removable memory module). As these examples illustrate, the storage media 514 can include a computer useable storage medium having stored therein particular computer software or data.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method of checking user authorization to access a database, the method comprising:
   receiving a query;
   producing an execution plan for the query, the execution plan indicating a type of access performed during execution of the query within the database according to the execution plan, the execution plan indicating a schema plan name of a schema containing a schema table used during execution of the query within the database according to the execution plan, and the execution plan indicating a table plan identity of a plan table used during execution of the query according to the execution plan;
   receiving an access rule applicable to a user associated with the query, the access rule indicating a second table identity of a second table, a second schema name identity of a second schema containing a second schema table, and a type of access;
   determining whether the access rule permits processing of the query according to the execution plan, the determining including:
      determining whether the type of access indicated by the execution plan matches the type of access indicated by the rule;
      determining whether the schema containing the schema table indicated by the schema plan name of the execution plan matches the second schema containing the second schema table indicated by the access rule; and
      determining whether the table plan identity indicated by the execution plan matches the second table identity of the second table indicated by the access rule; and
   rejecting the query in response to a determination that the table plan identity indicated by the execution plan does not match the second table identity of the second table indicated by the access rule, in response to a determination that the schema containing the schema table indicated by the schema plan name of the execution plan does not match the second schema containing the second schema table indicated by the second schema name of the access rule, or in response to a determination that the type of access indicated by the execution plan does not match the type of access indicated by the access rule.

2. The method of claim 1,
   wherein the access rule indicates a rule identity of a table to which access is permitted.

3. The method of claim 1,
   wherein the access rule indicates a rule identity of a table to which access is denied.

4. The method of claim 1,
   wherein the access rule indicates a type of access that is permitted.

5. The method of claim 1,
   wherein the access rule indicates a type of access that is denied.

6. The method of claim 1,
   wherein the access rule indicates a schema for which access is permitted.

7. The method of claim 1,
wherein the access rule indicates a schema for which access is denied.

8. The method of claim 1,
wherein the receiving the access rule includes receiving a first information structure that represents the access rule encoded in a first computer readable storage device that includes a combination of one or more of the indication of the second schema name of the second schema and the indication of the type of access indicated by the rule;
wherein producing the execution plan includes producing a second information structure that represents the execution plan encoded in a second computer readable storage device that includes one or more of the indication of the schema plan name of the schema and the indication of the type of access indicated by the execution plan;
wherein the determining whether the access rule permits processing of the query includes determining whether each constituent of the combination in the first information structure that represents the access rule matches a corresponding constituent of the second information structure that represents the execution plan.

9. The method of claim 8,
wherein the first information structure is further encoded with an indication of an action that is conditioned upon a determination that each constituent of the combination in the first information structure that represents the access rule matches a corresponding constituent of the second information structure that represents the execution plan.

10. The method of claim 9,
wherein the access rule specifies a rule for acceptance of the query for processing using the database; and
wherein the indicated action is to accept the query when each constituent of the combination in the first information structure that represents the access rule is determined to match a corresponding constituent of the second information structure that represents the plan.

11. The method of claim 9,
wherein the access rule specifies a rule for rejection of the query for processing using the database; and
wherein the indicated action is to reject the query when any constituent of the combination in the first information structure that represents the access rule is determined to not match a corresponding constituent of the second information structure that represents the plan.

12. The method of claim 8,
wherein the indication of the type of access within the first information structure includes an indication of one or the other of read only access or write access.

13. The method of claim 8,
wherein the indication of the type of access within the first information structure includes an indication of one or the other of read only access or write access; and
further including:
interpreting the indication of the type of access to the indicated table in the second information structure that represents the execution plan to determine whether such type of access constitutes read access or write access; and
wherein the determining whether the access rule permits processing of the query includes determining whether the indicated type of access from the first information structure that represents the access rule matches the interpreted type of access from the second information structure that represents the execution plan.

14. The method of claim 1,
wherein the user includes an application program.

15. The method of claim 1 further including:
permitting processing of the query in response to a determination that the access rule does allow processing of the query according to the execution plan.

16. A method of checking user authorization to access a database comprising:
receiving a query;
producing an execution plan, for the query, that indicates a database structure plan identity of a database structure used in the course of processing of the query, that indicates a schema plan name of a schema containing a schema table used during execution of the query within the database according to the execution plan, and that indicates a type of access to the indicated database structure performed in the course of processing the query;
receiving an access rule applicable to a user associated with the query, the access rule indicating a rule identity of a rule database structure, a second schema name of a second schema containing a second schema table, and a type of access to the rule database structure and that specifies an action;
determining whether the database structure plan identity of the database structure matches the rule identity of the rule database structure specified by the access rule, whether the schema containing the schema table indicated by the schema plan name of the execution plan matches the second schema containing the second schema table indicated by the second schema name of the access rule, and whether the type of access indicated by the execution plan matches the type of access indicated by the access rule; and
performing the action indicated by the access rule in response to a determination that the database structure plan identity of the database structure indicated by the execution plan matches the rule identity of the rule database structure specified by the access rule, that the schema containing the schema table indicated by the schema plan name of the execution plan matches the second schema containing the second schema table indicated by the second schema name of the access rule, and that the access type indicated by the execution plan matches the access type specified by the access rule.

17. The method of claim 16,
wherein the database structure indicated by the execution plan comprises a table; and
wherein the rule database structure specified by the access rule comprises a second table.

18. The method of claim 16,
wherein the type of access indicated by the access rule comprises one of a read access and a write access.

19. The method of claim 16,
wherein the type of access indicated by the access rule comprises one of a read access and a write access; and
further including:
interpreting whether the access type specified by the execution plan constitutes a read access or a write access.

20. The method of claim 16 further including:
rejecting the query in response to a determination that the database structure plan identity of the database structure indicated by the execution plan does not match the rule identity of the rule database structure specified by the access rule, that the schema containing the schema table indicated by the execution plan does not match the second schema containing the second schema table indicated by the access rule, or that the access type indicated by the execution plan does not match the access type specified by the access rule.

21. The method of claim 16, wherein the action indicated by the rule comprises one of allowing processing of the query or rejecting processing of the query.

22. An article of manufacture including a non-transitory storage device that includes computer readable code to cause a computer system to perform a process comprising:
receiving a query;
producing an execution plan for the query, the execution plan indicating a type of access performed during execution of the query within the database according to the execution plan, the execution plan indicating a schema plan name of a schema containing a schema table used during execution of the query within the database according to the execution plan, and the execution plan indicating a table plan identity of a plan table used during execution of the query according to the execution plan;
receiving an access rule applicable to a user associated with the query, the access rule indicating a second table identity of a second table, a second schema name of a second schema containing a second schema table, and a type of access;
determining whether the access rule permits processing of the query according to the execution plan, the determining including:
determining whether the type of access indicated by the execution plan matches the type of access indicated by the access rule;
determining whether the schema containing the schema table indicated by the schema plan name of the execution plan matches the second schema containing the second schema table indicated by the second schema name of the access rule; and
determining whether the table plan identity indicated by the execution plan matches the second table identity of the second table indicated by the access rule; and
rejecting the query in response to a determination that the table plan identity indicated by the execution plan does not match the second table identity of the second table indicated by the access rule, in response to a determination that the schema containing the schema table indicated by the schema plan name of the execution plan does not match the second schema containing the second schema table indicated by the second schema name of the access rule, or in response to a determination that the type of access indicated by the execution plan does not match the type of access indicated by the access rule.

23. A computer system comprising:
at least one processor configured to implement a database management system configured to,
receive a query,
produce an execution plan for the query, the execution plan indicating a type of access performed during execution of the query within the database according to the execution plan, the execution plan indicating a schema plan name of a schema containing a schema table used during execution of the query within the database according to the execution plan, and the execution plan indicating a table plan identity of a plan table used during execution of the query according to the execution plan; and
non-transitory storage device encoded with application program code to configure the at least one processor to,
receive an access rule applicable to a user associated with the query, the access rule indicating a second table identity of a second table, a second schema name of a second schema containing a second schema table, and a type of access;
determine whether the access rule permits processing of the query according to the execution plan, the determining including:
determining whether the type of access indicated by the execution plan matches the type of access indicated by the access rule;
determining whether the schema containing the schema table indicated by the schema plan name of the execution plan matches the second schema containing the second schema table indicated by the second schema name of the access rule; and
determining whether the table plan identity indicated by the execution plan matches the second table identity of the second table indicated by the access rule; and
rejecting the query in response to a determination that the table plan identity indicated by the execution plan does not match the second table identity of the second table indicated by the access rule, in response to a determination that the schema containing the schema table indicated by the schema plan name of the execution plan does not match the second schema containing the second schema table indicated by the second schema name of the access rule, or in response to a determination that the type of access indicated by the execution plan does not match the type of access indicated by the access rule.

* * * * *